United States Patent [19]

Meserole

[11] 4,327,776
[45] May 4, 1982

[54] THIN-WALLED METAL DUCT HAVING INTEGRAL REINFORCED COUPLING ENDS

[75] Inventor: Robert H. Meserole, Maumee, Ohio

[73] Assignee: Manville Service Corporation, Denver, Colo.

[21] Appl. No.: 868,606

[22] Filed: Jan. 11, 1978

Related U.S. Application Data

[60] Continuation of Ser. No. 737,666, Nov. 1, 1976, abandoned, which is a division of Ser. No. 630,123, Nov. 10, 1975, Pat. No. 4,044,581.

[51] Int. Cl.³ .............................. F16L 9/18; F16L 9/00
[52] U.S. Cl. ..................... 138/109; 138/121; 138/122; 138/135; 138/154; 138/174
[58] Field of Search ............... 138/109, 121, 122, 134, 138/135, 154, 173; 285/332, 332.4, 424, DIG. 4; 72/367, 368; 113/116 OT

[56] References Cited

U.S. PATENT DOCUMENTS

| 525,061 | 8/1894 | Schmidt et al. | 285/424 X |
|---|---|---|---|
| 1,315,548 | 9/1919 | Fletcher et al. | 138/122 |
| 1,340,818 | 5/1920 | Brinkman | 138/122 X |
| 2,818,281 | 12/1957 | Kurti | 285/424 X |
| 2,822,194 | 2/1958 | Fentress | 138/121 X |
| 2,986,169 | 5/1961 | McCormick | 138/109 |
| 3,101,209 | 8/1963 | Jorgenson | 138/109 X |
| 3,207,538 | 9/1965 | Pattillo | 285/424 X |
| 3,738,394 | 6/1973 | Westerbarkey | 138/173 X |
| 3,758,139 | 9/1973 | Meserole | 285/332 |
| 3,794,364 | 2/1974 | Williams | 285/DIG. 4 |

FOREIGN PATENT DOCUMENTS

| 522825 | 12/1955 | Belgium | 138/122 |
|---|---|---|---|
| 199026 | 7/1938 | Switzerland | 138/122 |
| 1405318 | 9/1975 | United Kingdom | 138/122 |

Primary Examiner—James E. Bryant, III
Attorney, Agent, or Firm—Robert M. Krone; Joseph J. Kelly

[57] ABSTRACT

Thin-walled metal duct particularly useful for heating and air-conditioning purposes is usually made by grooving, spiral wrapping, and seaming strips of thin metal sheet. The resultant tubular form provides the necessary rigidity to resist collapse of the tubular form. In the past, at least one end of the ribbed tubular ducts have been reformed to permit the ducts to be joined together. The end reforming techniques of the past have resulted in reformed ends having insufficient rigidity and strength to resist the abuse the ducts frequently receive in shipping, storing, handling, and installation.

The present product, method, and apparatus provide a ribbed thin-walled tubular duct having reformed ends with rigidity and strength superior to the prior art products. This achievement is accomplished in the present invention by moving more metal into the end portion of the duct prior to reforming the end portion, thus reinforcing the end portion of the duct.

11 Claims, 15 Drawing Figures

THIN-WALLED METAL DUCT HAVING INTEGRAL REINFORCED COUPLING ENDS

This is a continuation of application Ser. No. 737,666 filed Nov. 1, 1976, now abandoned, which was a division of Ser. No. 630,123, filed Nov. 10, 1975, now U.S. Pat. No. 4,044,581.

The present invention is related to grooved or ribbed thin-walled metal ducts having reformed ends with improved strength and rigidity, and to the method and apparatus used to manufacture such ducts.

BACKGROUND OF THE INVENTION

Round, thin-walled, spirally grooved or ribbed metal ducts and their method of manufacture are known as evident by U.S. Pat. Nos. 3,435,852 and 3,621,884. Round ducts of this type have many uses, e.g., as cold or warm air ducts for residential, commercial, and industrial construction.

It is also known to reform at least one end of such ducts to facilitate joining two ducts together as evidenced by U.S. Pat. Nos. 3,708,867, 3,758,139, and 3,794,364. These methods involved rolling one end of the duct to flatten the spiral ribs sufficiently to permit the threading of the rolled duct end into an unrolled duct end, or rolling the ribs on both ends of the duct down with a narrow roller and then crimping one of the ends to make it small enough to fit into a rolled but uncrimped end. The problem with each of these methods is that the ends are fragile, particularly when the ducts are made from very thin metal, such as 15 mils or less, and particularly when aluminum metal is used. The fragile duct ends become damaged in shipment, handling, or installation rendering the ducts either useless or requiring expensive repair. As a result the tendency has been to use thicker gage metal to provide for stronger ends or to use heavier gage metal coupling members. Both alternatives are less than desirable.

The object of the present invention is to provide metal ducts having ribs with reformed ends that permit joining without auxiliary coupling members, which ends are much stiffer and significantly more resistant to damage than the prior art reformed ends.

SUMMARY OF THE INVENTION

The present invention provides tubular metal duct sections having at least one integral stiffened and reinforced end portion having at least three layers of metal over a majority of the area of the end portion. Preferably both end portions of the duct are reformed and one of the end portions is also tapered to enable that end portion to be inserted into a non-tapered end portion of a second duct section.

The improved duct sections of the present invention are made by compressing the duct lengthwise from at least one end, and preferably from both ends, to produce at least one end portion in which the lengthwise distance between the ribs in the end portion is significantly less than the lengthwise distance between the ribs in an uncompressed intermediate portion of the duct adjacent to the end portion of the duct, at least partially removing the ribs from at least one end portion of the duct by working the walls of the end portion to at least partially collapse the ribs and to form a cylindrical end portion, and preferably finally tapering an outer extremity of at least one end portion to reduce the outside diameter of the tapered portion to less than the inside diameter of the cylindrical end portion. Preferably, the amount of lengthwise compression at the ends of said duct is sufficient to produce end portions having three layers of the thin-walled metal over a majority of the area of the walls of the end portions after the rib collapsing step.

A suitable apparatus for practicing the method of the present invention to produce the ducts of the present invention comprises means for supporting a duct, means for compressing the duct lengthwise from at least one end to produce at least one end portion having a greater number of ribs per linear dimension of duct than an intermediate portion of the duct adjacent to the end portion, and means for at least partially collapsing the ribs in the end portion of the duct without changing the generally cylindrical shape of the end portion.

DETAILED DESCRIPTION AND PREFERRED EMBODIMENTS

Figure 1:
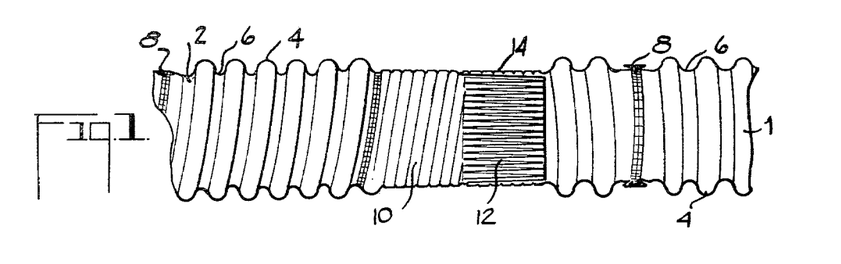
FIG. 1 shows two adjacent ribbed metal ducts joined together by their reformed ends in accordance with the present invention. The righthand duct is shown in partial cross-section.

FIG. 1 shows two adjacent helically or spirally ribbed duct sections having reformed ends in accordance with the present invention and joined together without the need for separate coupling members. The lefthand duct 2 and the righthand duct 1 both comprise a thin metal wall having spiral ribs 4 running therearound with spiral grooves 6 occuring between the ribs 4. Since this duct was made by spirally wrapping and seaming a strip of metal around a mandrel, spiral seams 8 also appear periodically along the lengths of the ducts.

Metal duct useful in the present invention can be made in a variety of ways, such as the methods described in U.S. Pat. Nos. 3,753,363 and 3,753,367. The seams 8 can also be made in a variety of ways including those disclosed in U.S. Pat. Nos. 3,621,884 and 3,865,146.

Duct 2 in FIG. 1 has a reformed male end comprising a reinforced portion 10 and a reinforced and tapered portion 12. The tapered portion 12 can be of the type and can be formed in the manner disclosed in U.S. Pat. Nos. 3,708,864 and 3,758,139. The reformed end of the righthand duct 1 in FIG. 1 is shown in cross-section and comprises a reinforced portion 14. The tapered portion 12 is tapered to a diameter at the extremity sufficiently small to allow the tapered portion 12 to be inserted inside the female reformed portion 14 as shown in FIG. 1.

The reformed portion 10 and the reformed portion 14 form flat surfaces for the application of any approved duct tape, usually pressure-sensitive, for sealing the connection between the two ducts. Screws, rivets, or other fastening means can also be used in a conventional manner to prevent the ducts from separating at the joint.

Figure 2:
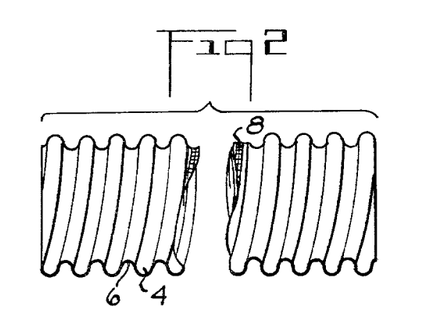
FIG. 2 is a broken view of a spirally ribbed metal duct of the type typically used as a starting material in the present invention.

FIG. 2 shows a typical helically ribbed duct prior to reforming the ends in accordance with the present invention. While this duct is the type used in the preferred embodiment, other ducts could be used with the present invention. For example, smooth-walled ducts having helical or circumferential ribs only in the end portions of the duct or ducts having circumferential ribs throughout the length of the duct can be used.

While the process of the present invention can be used to reform and reinforce an end portion metal duct with walls of any thickness, the invention is particularly useful on ribbed duct made from thin metal such as aluminum, stainless steel, steel, galvanized steel, copper and other metals, either coated, laminated or uncoated, conventionally used in the manufacture of ducts. For example, ribbed ducts made from sheet metal having a thickness of 15–18 mils or less are frequently used to make a duct of the type shown in FIG. 2. The invention is particularly useful when the sheet metal is about 12 mils or less, preferably 10 mils or less and most preferably less than 8 mils, for example 6 mil aluminum or alloys thereof. These thicknesses refer to ducts having diameters of about 3 to 22 inches. When larger diameter ducts are used, thicker sheet metal is required because of the greater radius of the metal and the resultant lower rigidity of the duct walls.

Figure 9:
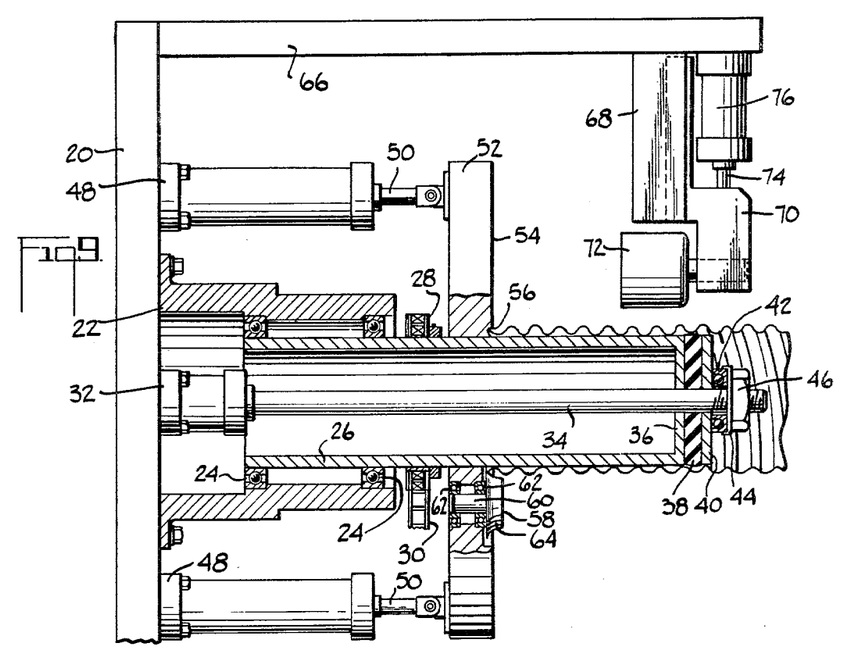
FIGS. 9–11 are partial elevational views, shown partly in cross-section and partly broken away, of an apparatus of the present invention useful in making the reformed ends shown in the previous figures shown in various stages of operation.

FIG. 9 shows an apparatus in accordance with the present invention comprising a main frame 20 which is usually in the vertical position and which is supported by a conventional metal base (not shown). Attached to the base 20 is a mandrel holder 22 which, by the aid of bearings 24, support a mandrel 26 in a rotatable relationship. The mandrel 26 is surrounded by a sprocket 28 which can be driven by a conventional drive means (not shown) with the aid of a chain 30.

Also connected to the base 20 is a conventional air or hydraulic cylinder 32 having an extended rod 34 passing along the axis of the mandrel 26 and through a hole in an end 36 of the mandrel 26. A layer 38 of an elastomeric material, having a hole in its center and having a relaxed diameter essentially the same as that of mandrel 26, is positioned adjacent the end 36 of the mandrel 26 and surrounds the rod 34. A round, rigid, usually metal, plate 40 having a diameter essentially the same as the diameter of the mandrel 26 and having a hole in its center is positioned around the rod 34 and adjacent to the elastomeric layer 38. A thrust bearing 42 is positioned around rod 34 and adjacent to plate 40 and is snuggley maintained in position by a washer 44 and a nut 46 threaded onto the end of the rod 34.

Also attached to the base plate 20 are a plurality of cylinders 48, preferably four cylinders located at 12 o'clock, 3 o'clock, 6 o'clock and 9 o'clock positions. Rod ends 50 of the cylinders 48 are connected in a conventional manner to a forming plate 52. The forming plate 52 has a hole in its center through which the mandrel 26 passes with a slight clearance. The clearance between the outer surface of the mandrel 26 and the plate 52 is only sufficiently great to allow rotation of the mandrel 26 without causing friction with the forming plate 52. Located on a working face 54 of the plate 52 is a circular groove 56 located next to the outer surface of the mandrel 26. The groove 56 extends completely around the opening in plate 52 for the mandrel 26 except in the area behind an edge forming wheel 58. Forming plate 52 is shown partially broken away to better illustrate the location of the edge forming wheel 58 mounted in a rotatable manner on a shaft 60 which is supported by bearings 62. The edge forming wheel 58 has a concave working surface 64.

An upper frame member 66 is attached to the frame member 20 and is supported in a cantilevered position. Attached to the upper frame member 66 is an arm 68 to which is attached in a vertically slideable relationship a dog leg support 70. A hard metal roller 72 is rotatably attached by a conventional shaft and conventional bearings (not shown) to the dog leg support 70. Also attached to the dog leg support 70 in a conventional manner is a rod end 74 of a hydraulic or pneumatic cylinder 76 which in turn is mounted to the upper frame member 66. Activation of the cylinder 76 to extend the rod end 74 moves the dog leg support 70 and the roller 72 downwardly and actuation of the cylinder 76 to retact the rod end 74 moves the dog legged support 70 and the roller 72 upwardly.

The apparatus shown in FIG. 9 operates as follows. A duct such as the type shown in FIG. 2, is pushed over the mandrel 26 and up against the groove 56 in the forming plate working face 54 and against the concave surface 64 of the forming wheel 58 in the manner shown in FIG. 9. Cylinder 32 is then actuated to retract the rod 34 which causes the plate 40 to be pulled in the direction of the mandrel end 36. This action causes the elastomeric layer 38 to be compressed, (see FIG. 10) thus increasing its diameter and pressing the outer surface of the layer 38 against the inside of the ribbed duct. This action holds the portion of the ribbed duct in contact with layer 38 in place on the mandrel 26.

Figure 3:
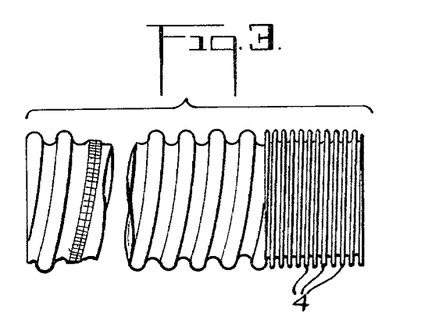
FIG. 3 is a broken view of the duct shown in FIG. 2, but after one end of the duct has been compressed lengthwise to increase the linear density of the ribs in an end portion.
Figure 10:
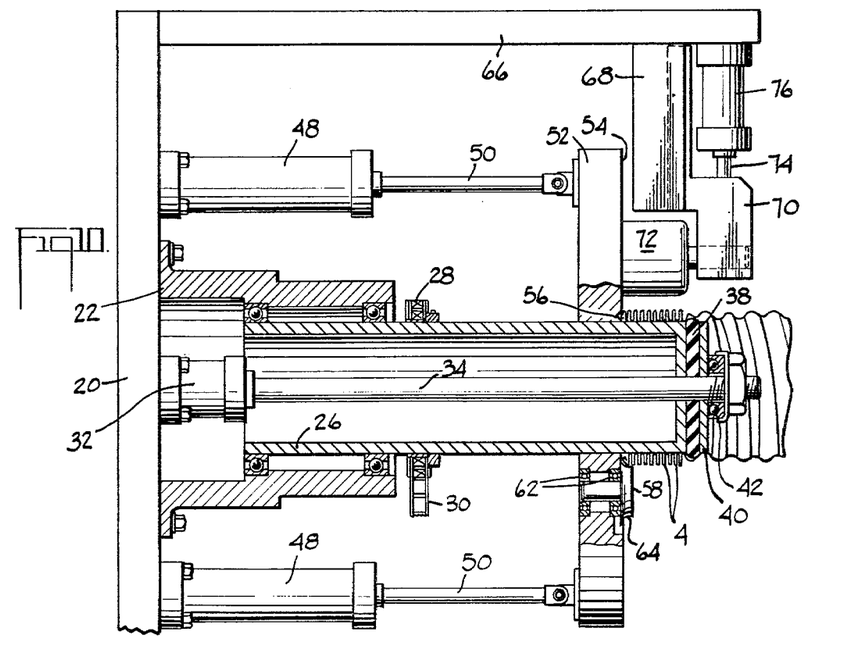

In the next step, shown in FIG. 10, cylinders 48 are actuated to extend rods 50. Extension of the rods 50 move the forming plate 52 to the right compressing linearly the end portion of the duct, increasing the density of the ribs 4 in the end portion of the duct between the working face of the forming plate 52 and the elastomeric gripping member 38 to produce a configuration as shown in FIG. 3. The distance between the ribs 4 in the end portion after plate 52 has been moved sufficiently to contact, or almost contact, the end of roller 72 is substantially less than the distance between the ribs 4 in the non-compressed portion of the duct.

Next, the mandrel 26 is rotated by actuating a conventional drive means (not shown) which, through drive chain 30, rotates the mandrel 26 and the sprocket 28 attached thereto. Since the duct is gripped by the elastomeric member 38 rotation of the mandrel 26 also causes the elastomeric gripping member 38, the plate 40, and the ribbed duct to rotate. The rod 34 does not rotate because of the thrust bearing 42. Rotation of the duct in the groove 56 causes the leading edge of the duct to be turned outwardly, or sometimes inwardly. When the turned edge of the duct contacts the working surface 64 of roller 58 the working surface 64 tends to further turn the edge back upon itself as will be better seen in later figures.

Figure 11:
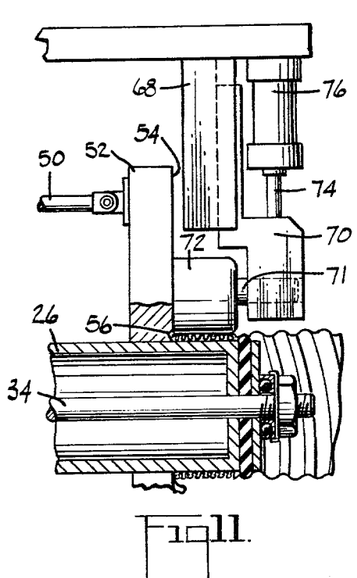
Figure 12:
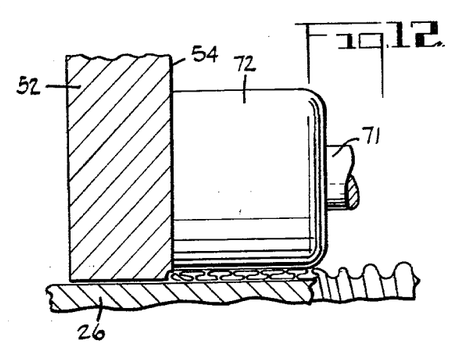
FIG. 12 is an expanded view of a portion of the apparatus of FIG. 11 and better shows the reforming of an end portion of the duct.

Referring to FIG. 11, showing only a portion of the apparatus shown in FIG. 10, the next step is to activate cylinder 76 extending rod 74 and lowering the dog leg support 70 and the roller 72 such that the roller 72 forcefully bears against the ribs on the rotating duct. The working face of the roller 72 can be a smooth surface, a knurled surface, a surface having a plurality of angular shallow grooves, e.g., about 5 mils deep, or any surface that will grip the duct metal during rolling. Preferably the surface of the roller is knurled like that shown in FIGS. 4 and 5 of U.S. Pat. Nos. 3,708,867 and 3,758,139, the disclosures of which are incorporated herein by reference. Sufficient force is applied by the cylinder 76 and the roller 72 to cause the ribs to be flattened, as shown in better detail in FIGS. 12, 13, and FIG. 5.

Figures 4, 5, 6, 7, 8:
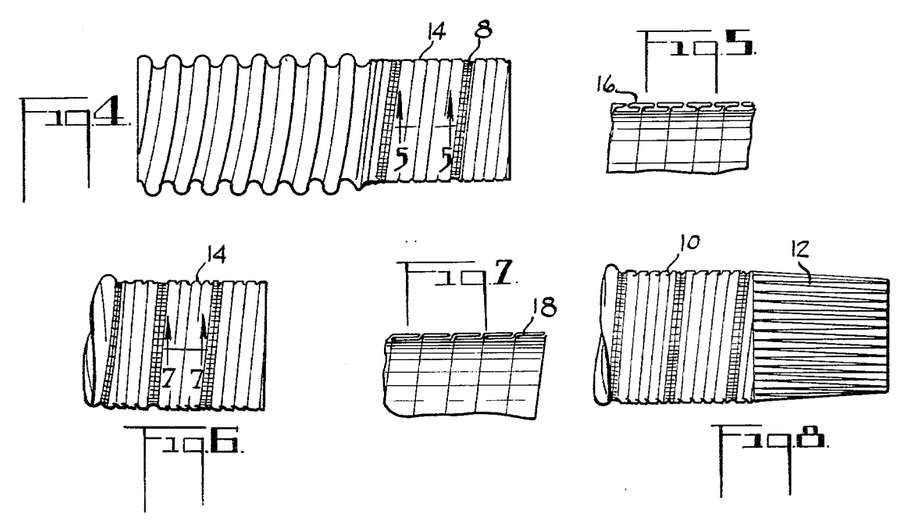
FIG. 4 shows a duct having a reformed end portion resulting from the rolling of an end portion like that shown in FIG. 3.
FIG. 5 is an enlarged partial cross-sectional view taken along lines 5—5 of FIG. 4 and shows generally the metal configuration in the wall of the reformed end portion.
FIG. 6 is a partial view of a duct having a reformed end representing another embodiment of the invention.
FIG. 7 is an enlarged partial cross-sectional view taken along lines 7—7 of FIG. 6 and shows generally the metal configuration in the wall of the reformed end of this embodiment.
FIG. 8 is a partial view of a male duct having a reformed end made according to the present invention and having a tapered outer extremity.
Figure 13:
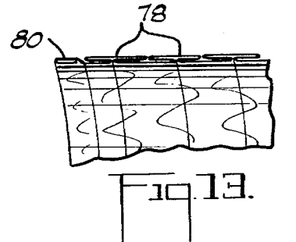
FIG. 13 is a partial cross-sectional view of the finished reformed end of the duct shown in FIG. 12.

In the apparatus shown in FIGS. 9-12, a wall configuration such as that shown in FIGS. 5 and 13 is produced. This configuration comprises a series of generally squatty T-shaped members which result in a layered wall having three layers of metal along a majority of its length. These extra layers of metal stiffen and reinforce the end portion of the duct. In wall portions shown FIGS. 5 and 13, at least three layers of metal preferably exist over at least 85% of the length of the reformed end. This can be varied by varying the amount of lengthwise compression in the end portion prior to rolling, depending upon the degree of stiffness and strength desired in the reformed end.

In the area of the seams, see FIG. 4, the number of layers of metal may exceed three, depending upon the type of seam used. As shown in FIG. 13, the leading end of the duct comprises two layers resulting from the end being turned in by the groove 56 and rolled back by the surface 64 of the forming wheel 58 and then flattened down by roller 72. This produces a leading end which is smooth, eliminating any sharp edges that could make manual handling hazardous.

The next step is to deactivate cylinder 76 which raises roller 72 vertically, to deactivate the cylinders 48 to withdraw the forming plate 52, to deactivate the driving means rotating the mandrel, and to deactivate cylinder 32 allowing the elastomeric gripping layer 38 to collapse and allowing the duct to be removed from the mandrel 26. Assuming that the apparatus shown in FIGS. 9-11 has made a female reformed end which might typically be about 1¼ inches long, the next step preferably would be to reform the opposite end of the duct to form a male end. It is desired that the male end portion be longer than the female end portion, e.g. about 2½ inches long typically.

Reforming of the longer male end could be done on a second machine identical to the machine shown in FIG. 9 except having a wider roller 72, or the roller 72 on the machine in FIG. 9 could be replaced with a wider roller needed for reforming the male ends. After the male end has been reformed in the same manner as the female end, it is desirable to taper the extremity of the male end to facilitate its entry into a female reformed end of a second duct. In the preferred embodiment, the male end can be tapered by crimping in the manner disclosed in U.S. Pat. Nos. 3,708,867 and 3,758,139 to produce a reformed male end as shown in FIG. 8. The crimped portion 12 is preferably about 1¼ inches long and the flattened reformed male end portion 10 is also about 1¼ inches long. These dimensions are merely a matter of choice and could be varied to suit any particular installation.

Figure 14:
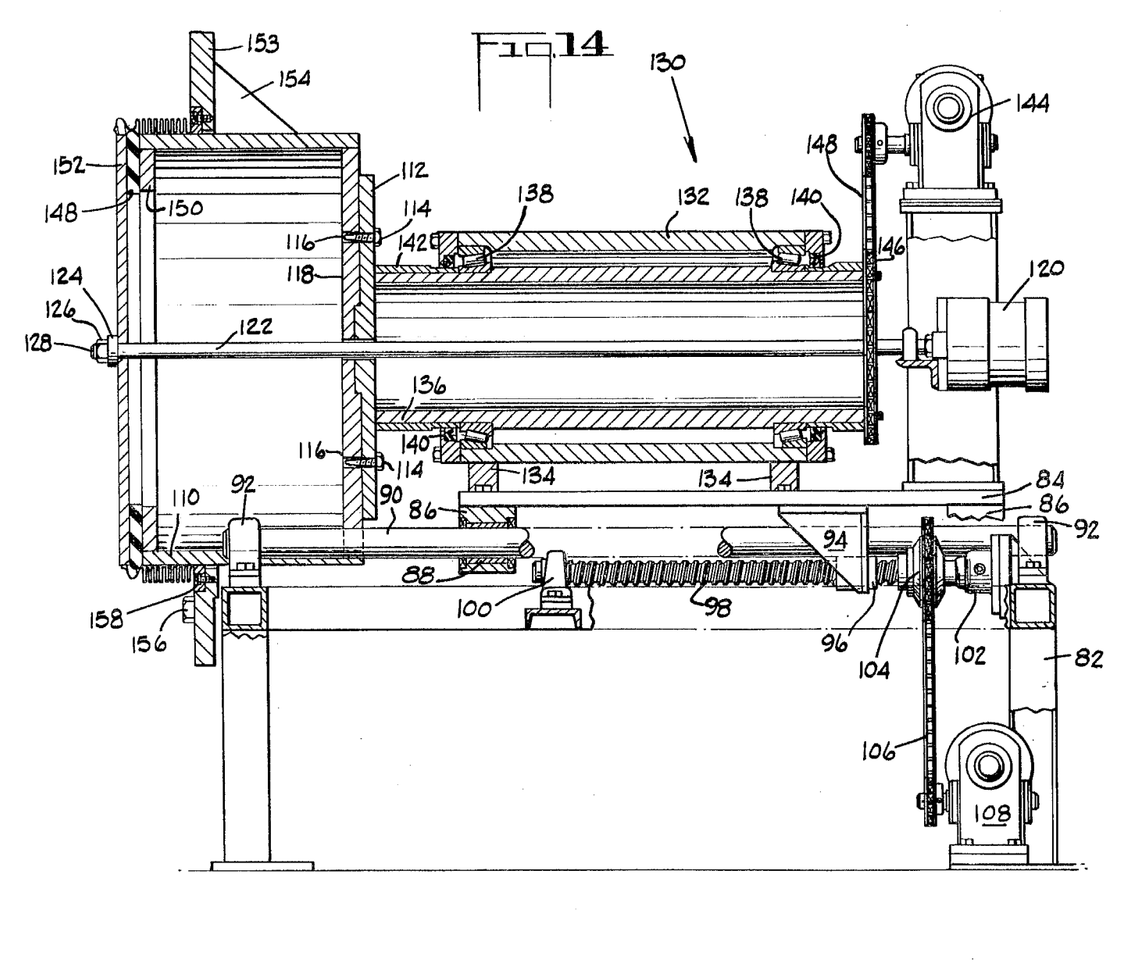
FIG. 14 is a partial elevational view, shown partly in cross-section, of a preferred embodiment of the apparatus of the present invention. Some portions are broken away for better illustration.
Figure 15:
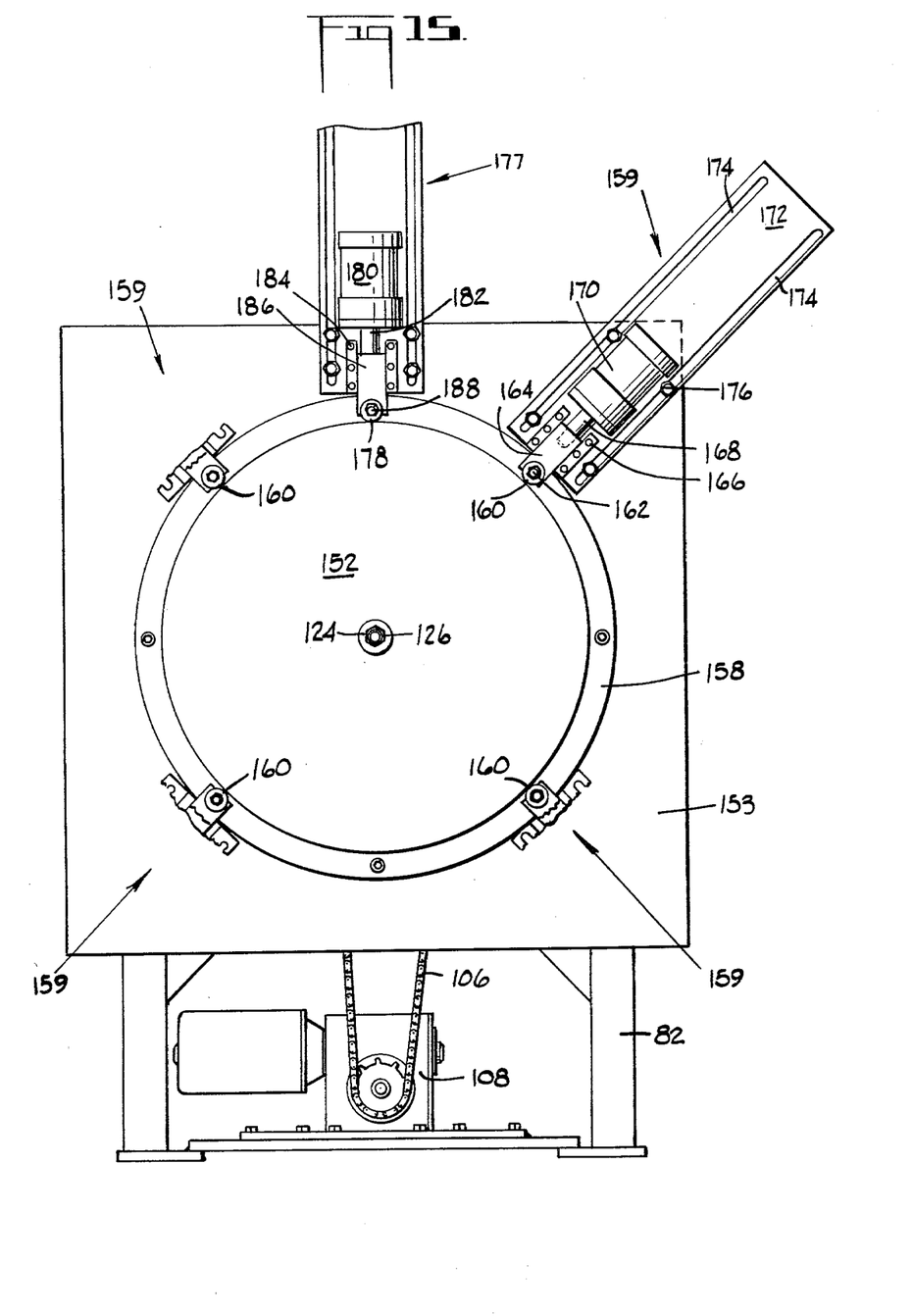
FIG. 15 is a partial end view of the apparatus shown in FIG. 14. Some parts are only partially shown for better illustration.

FIGS. 14 and 15 show the preferred apparatus of the present invention. FIG. 14 is a partial cross-sectional and partially broken elevational view of a portion of the apparatus. The remainder of the apparatus is shown in end view in FIG. 15.

Referring to FIG. 14, the apparatus comprises a main stationary frame 82 and a second movable frame 84. The second movable frame 84 is carried on two rods 90 by way of supports 86 and bushings 88. The rods 90 are supported on the main frame 82 by rod holders 92. The movable frame 84 is moved back and forth along the length of rods 90 by moving the arm 94. Connected to the arm 94 is a threaded tubular member 96 which surrounds a spirally grooved shaft 98 rotatably mounted in bearings 100 and 102. The spirally grooved shaft 98 can be rotated clockwise or counter-clockwise by rotating a sprocket 104 fixedly attached to the shaft 98. The sprocket 104 is rotated by a drive chain 106 connected to a reversible drive 108. Preferably the tubular threaded member 96 and shaft 98 are a conventional Saginaw screw and a tubular recirculating ball housing assembly. The sprocket 104 preferably is a combination sprocket and torque limiter.

Mounted on the movable frame 84 is a removable and rotatable mandrel 110. The mandrel 110 is held in the proper position, on a mandrel hub 112, by pins 114 rigidly attached to the hub 112 and extending through centering holes 116 in a back plate 118 of the mandrel 110. The back plate 118 is held against the hub 112 by any suitable means such as a pneumatic or hydraulic cylinder 120 acting through a rod 122, a thrust bearing 124, and a nut 126 threaded onto a threaded end portion 128 of rod 122. The back plate 118 can also be properly positioned and held against the hub 112 by any suitable fastening means such as conventional bolts, screws, etc. The fastening means should be readily removable to allow the mandrel to be removed and a different sized mandrel inserted quickly.

The mandrel 110 and the mandrel hub 112 are held in place and rotated by a mandrel support assembly 130. The mandrel support assembly comprises a support frame 132 which is mounted to the linearly movable frame 84 by brackets 134. The mandrel support frame 132 supports a hollow tubular member 136 which is fixedly attached to the hub 112 in a rotatable manner using conventional bearing assemblies 138 and conventional seals 140. Preferably, the rotatable tubular member 136 has removable machined members 142 on each end which act as smooth surfaces for the seals 140 to ride against and also to help hold the bearings 138 in place.

The mandrel 110 is rotated by a drive 144 which is mounted on the movable frame 84. The drive 144 rotates the tubular member 136 by rotating a sprocket 146 mounted on the end of the tubular member 136 by way of a conventional drive chain 148.

An elastomeric gripping layer 148 is held against a front plate 150 of the mandrel 110 by an outer rigid plate 152 in a similar manner as the apparatus previously described and shown in FIGS. 9–11.

A rigid heavy plate 153 is attached to the main frame 82 by way of angled supports 154 and bolts 156. A removable edge forming face 158 is mounted to the heavy plate 153 by any suitable manner, such as counter-sunk flathead machine screws. The forming plate 158 contains a groove of the same type as groove 56 in plate 52 shown in FIG. 9. Forming plate 158 should be easily removable because forming plates having different inside diameters are necessary when different sized mandrels are used to accommodate different diameter ducts.

All of the reforming equipment is not shown on FIG. 14 in order that the portion of the apparatus shown in FIG. 14 could be better illustrated. The remainder of the reforming equipment is shown in FIG. 15, which is an end view of the apparatus shown in FIG. 14 looking from left to right. Mounted on the heavy plate 153 is at least one, and preferably four, end portion rolling assemblies 159, preferably mounted 90° from one another around the periphery of the mandrel. Each roller assembly 159 comprises a roller 160 which is like, and for the same purpose as, roller 72 shown in FIG. 11. The roller 160 is free to rotate on a shaft 162 extending through a clevis support 164. The clevis support is guided and maintained in proper alignment by the guide members 166. The roller 160 is moved towards or away from the mandrel surface by activation of a cylinder 170 which extends or withdraws a rod 168 attached to the clevis 164.

The cylinder 170 is fixedly attached to a mounting plate 172 which contains two grooves 174 for mounting bolts 176. These grooves allow the roller assemblies 159 to be moved towards or away from the axis of the mandrel to compensate for different diameter mandrels and different diameter ducts. Only portions of the other roller assemblies 159 are shown because they are identical to the roller assembly shown in full.

Also mounted on the heavy plate 153 is a leading edge forming roller assembly 177 comprising a roller 178 which is identical to the roller 58 shown in FIG. 9. Only one leading edge forming roller assembly 177 is necessary and, except for the roller 178, it is constructed and mounted in an identical manner as the end portion rolling assembly 159.

In operation of the apparatus shown in FIGS. 14 and 15, the drive 108 is actuated in the proper direction to move the frame 84 and the mandrel 110 to the left (FIG. 14) a desired distance. A duct of the type shown in FIG. 2 is then pushed over the mandrel and against the forming face 158. The other end of the duct can be supported in any conventional means to permit rotation of the duct around its horizontal axis, for example a vertically adjustable set of cradle rolls. Next, cylinder 120 is actuated to pull the plate 152 against the elastomeric gripping layer 148 to cause it to expand in diameter and securely grip the inside of the duct to prevent that portion of the duct adjacent the end portion from moving along the mandrel surface in the next step. Drive 108 is then actuated to cause the frame 84, the mandrel 110 and the duct secured thereto to move to the right compressing the end portion of the duct as shown in FIG. 14. This latter action linearly compresses the end of the duct against the forming plate 158 forming a duct of the type shown in FIG. 3. The drive 108 is inactivated as soon as the desired amount of linear compression is achieved.

Drive 144 is now actuated causing the mandrel 110 and the duct thereon to rotate, typically at about 10 to 12 rpms. The thrust bearing 124 permits the mandrel 110 and the plate 152 to rotate while the rod 122 remains stationary. Rotation of the duct and its leading edge against the wear plate 158 and the groove therein, like groove 56 in FIG. 9, causes the leading end of the duct usually to be flared outwardly, but because of the nature of the thin-walled ducts, part of the circumference may be turned inwardly. As long as the leading edge is bent over and rolled down the direction of the bend is not critical. Cylinder 180 is then actuated to extend rod 182 and clevis 186 guided by guides 184 which lowers the leading edge forming roller 178 against the flared out or turned in end of the duct while the roller 178 rotates on the shaft 188. This causes the flared out or turned in end of the duct to be turned back upon itself as shown in FIGS. 10 and 13. Either simultaneously or after roller 188 has been lowered into its functional position, one or more units 159 are actuated in a similar manner to lower rollers 160 against the ribs of the duct to reform the duct end in the manner shown in FIG. 12. After sufficient revolutions of the duct to produce the desired flattened duct end, usually about two revolutions, the units 159 are actuated to withdraw the rollers 160, and the cylinder 180 is actuated to withdraw the roller 178. The drive 144 is stopped, stopping the rotation of the mandrel 110, cylinder 120 is deactuated allowing the elastomeric layer 148 to assume its original diameter thus releasing the duct, and the duct having a reformed end portion is removed from the mandrel.

If the reformed end is intended for a female end the reforming of that end is complete. If the reformed end is intended as a male end, it is necessary to further reform the extremity of the reformed end to achieve a male end as shown in FIG. 8 on another apparatus as disclosed in U.S. Pat. Nos. 3,708,867 and 3,758,139.

The above described operation of the apparatus of FIGS. 14 and 15 is typical and can be varied. For example, the rotation speed of the mandrel will depend to a certain extent on the diameter of the duct being formed, with smaller duct permitting a faster rotational speed than larger duct to achieve the same linear reforming speed on the surface of the duct. Also, the same machine can be used to form female ends and the wider male ends by placing male rollers on two of the opposed reforming assemblies 159 and female rollers on the remaining two opposed assemblies 159 and actuating only the appropriate opposed assemblies.

The apparatus shown in FIGS. 14 and 15 can be operated in a different manner to produce a different wall structure of the type shown in FIGS. 6 and 7. In the wall structure shown in FIGS. 6 and 7, the compressed ribs are bent over and flattened instead of being mashed down and flattened in the embodiment previously described and shown in FIG. 5.

To produce the embodiments shown in FIGS. 6 and 7, operation of the apparatus of FIGS. 14 and 15 is as follows. After the duct has been linearly compressed a sufficient amount by actuation of the drive 108, drive 144 is actuated to begin rotation of the mandrel and the duct thereon. Cylinder 180 is actuated to lower the roller 178 into position to roll the flared or tuned in leading edge of the duct back upon itself. After this objective is accomplished, cylinder 180 is activated to raise roller 178 to its original position. Drive 108 is then actuated to move the mandrel 110 to the left, looking at FIG. 14, a sufficient distance to permit rolles 160 to be lowered against the surface of the mandrel 110 without contacting the duct. Units 159 are then actuated to extend rollers 160 so that the roller surface is spaced from the surface of the mandrel an amount essentially equal to the desired thickness of the wall in the reformed end portion of the finished duct. With the mandrel 110 rotating and the rollers 160 in this position, drive 108 is then actuated to move the mandrel to the right, looking at FIG. 14. The edge of the roller 160 facing the ribs in the end portion of the duct has a radius, such as that shown on roller 72 in FIG. 13. As the rounded edge of the roller contacts the ribs as the mandrel moves to the right, the ribs are first bent over in a gradual but progressive manner and finally flattened by the flat portion of roller 160. The mandrel is continued to be moved to the right by drive 108 until all of the ribs in the linearly compressed end portion of the duct have been bent over and flattened in the manner shown in FIGS. 6 and 7. In the cross-section shown in FIG. 7 the three layers of metal form a series of generally flattened Z-shaped members. Drive 108 is then stopped, assemblies 159 are actuated to retract rollers 160, cylinder 120 is deactuated to release the duct from thwe mandrel, and the duct is removed from the mandrel.

In describing the invention certain embodiments and reformed metal configurations have been used to illustrate the invention and the practice thereof. However, the invention is not limited to these specific embodiments and configurations as other embodiments or configurations, and modifications within the spirit of the invention will readily occur to those skilled in the art on reading this specification. The invention is thus not intended to be limited to the specific embodiments disclosed, but instead is to be limited only by the claims intended hereto.

What I claim is:

1. In a tubular metal duct section formed by spirally wrapping and seaming a strip of metal around a mandrel wherein said strip of metal has longitudinally extending ribs and grooves, cutting the resulting tubular product into sections and reforming at least one end portion of each section so as to produce a tubular metal duct section comprising:

(a) an intermediate portion having a wall with ribs and grooves therearound between turns of a spiral seam, and (b) at least one relatively stiff reformed end portion, integral with said intermediate portion, the improvement comprising:

(i) said one end portion being stiffened and reinforced by being compressed axially so that the distance in an axial direction between adjacent turns of said spiral seam in said one end portion is substantially less than the distance in an axial direction between adjacent turns of said spiral seam in said intermediate portion, (ii) said stiffened and reinforced end portion having at least three layers of metal in a radial direction over a majority of its axial extent, each of said layers being in substantial parallel relationship with each other as viewed in axial cross-section through said end portion and each of said layers having at least one major surface in very close proximity to a major surface of another of said layers.

2. A duct section as defined in claim 1 wherein a lengthwise cross-section through the wall of said end portion discloses that the three layers of metal form a series of generally flattened upright T-shaped members with a flattened inverted T-shaped member located between two adjacent flattened upright T-shaped members in the series.

3. A duct section as defined in claim 1 wherein a lengthwise cross-section through the wall of the end portion discloses that the three layers of metal form a series of generally flattened Z-shaped members.

4. A duct section as defined in claim 2 wherein at least three layers of metal in a radial direction are in at least 85% of the axial extent of said end portion.

5. A duct section as defined in claim 3 wherein at last three layers of metal in a radial direction are in at least 85% of the axial extent of said end portion.

6. A duct section as defined in claim 2 wherein said metal has a thickness of less than about 15 mils.

7. A duct section as defined in claim 5 wherein said metal has a thickness of less than about 15 mils.

8. A duct section as defined in claim 6 wherein both ends of the duct are reinforced and stiffened and one of the ends has a tapered extremity, tapering to a diameter sufficiently small to enable the tapered end portion to be inserted into an untapered reinforced and stiffened end portion of a second duct.

9. A duct section as defined in claim 7 wherein both ends of the duct are reinforced and stiffened and one of the ends has a tapered extremity, tapering to a diameter sufficiently small to enable the tapered end portion to be inserted into a untapered reinforced and stiffened end portion of a second duct.

10. A duct section as defined in claim 8 wherein the metal is a aluminum, or an alloy thereof, having a thickness of 10 mils or less.

11. A duct section as defined in claim 9 wherein the metal is aluminum or an alloy thereof having a thickness of 10 mils or less.

* * * * *